UNITED STATES PATENT OFFICE.

HENNELL STEVENS, OF BRAZORIA, TEXAS.

IMPROVEMENT IN THE MANUFACTURE OF FERTILIZERS.

Specification forming part of Letters Patent No. 144,877, dated November 25, 1873; application filed May 27, 1873.

*To all whom it may concern:*

Be it known that I, HENNELL STEVENS, of Brazoria, county of Brazoria and State of Texas, have invented an Improved Process of Manufacturing a Fertilizer from the Carcasses of Tallow-Rendering Animals, of which the following is a specification:

This invention relates to that class of processes employed for converting animal matter into a fertilizer which may readily be transported.

In most if not all of the large tallow-rendering factories of Texas and elsewhere, the fatty matter is separated from cattle, after the animal has been skinned, by boiling the entire carcass in a strong tight vessel of large capacity, under steam-pressure, until the meat, muscle, and offal are thoroughly disintegrated, and the bones softened and crumbled. The tallow thus liberated rises to the top of the animal mash, and is then drawn off from the tank or vessel by means of cocks; and in a place like Texas, where animals are slaughtered for the hide and tallow, the residue of the tank, being mixed with a large amount of water and the bones so softened and crumbled that they cannot be separated, is thrown away, thus wasting a vast amount of the most valuable material for fertilizing purposes.

This refuse of the tallow-rendering tank, hitherto, in Texas, South America, and elsewhere, being, in the main, a waste product, I utilize by converting it into a fertilizer by further treatment, as follows: After the fat has been drawn off, as above signified, I run the residue into a vat or tank and allow the solid matter to settle to the bottom. The supernatant liquid I then draw off by suitable means into another vessel, and rapidly evaporate it, by the application of steam or fire, to a sirupy consistency. With this sirup I then thoroughly mix and incorporate the solid matter which settled to the bottom of the vat from which the supernatant liquid was drawn, and, at the same time, I also add and thoroughly mix with the whole mass of matter a sufficient quantity of plaster-of-paris to absorb and combine with the remaining moisture. For this purpose, I use of the plaster-paris about twenty per cent. of the original weight of the meat, which, if the evaporation of the supernatant liquid has been carried far enough, will convert the whole into a friable mass, which, after a short exposure in drying-sheds, can be ground to a fine powder which is not subject to decomposition, and in fertilizing properties is equal to the best guano.

My object in using plaster-of-paris, as above set forth, is manifold. First, the plaster-of-paris not only absorbs water, like chalk, or clay, or marl, and in a vastly greater degree, but it combines chemically with it in large proportion; and its attraction for it is so strong that it extracts the water mechanically combined with the fibers of the meat, and renders them so friable that they almost fall to powder. Second, as is well known, plaster-of-paris has a peculiar property of fixing ammonia and preventing it from being volatilized and lost, besides having specific manurial qualities, and hence, of itself, is valuable as a fertilizer. Its use, as above stated, is, therefore, to extract and combine with the residuum moisture of the animal matter, so as to render it possible to powder and transport them in the form of a merchantable commodity. Third, the plaster-of-paris destroys and counteracts the hygrometric properties of the meat, so that the fertilizer will keep without injury for any length of time in any climate; and, fourth, it fixes and locks up, as it were, the nitrogenous elements of the meat, preserving them from loss till required for the use of the growing plants.

Dried clay, chalk, and marl, have the same properties, though in a far less marked and much inferior degree; and, while they might be used as base substitutes for the plaster-of-paris, such use would, in a great measure, be at the sacrifice of the beneficial qualities of my fertilizer. They might be substituted for the plaster-of-paris by mixing a small proportion of hydraulic cement with them to combine with the moisture of the meat. The cement alone should not be used, as it would decompose the animal matters and liberate a large percentage of the ammonia. Hence, while I might use chalk, dry clay, and marl, and like mineral substances mixed with hydraulic cement in the preparation of my fertilizer, still, for reasons above signified, I rely upon the use of plaster-of-paris as giving the best results in the process of its manufacture.

Having described my invention, what I claim as new, and desire to secure by Letters Patent, is—

The improved process of converting animal matter into a fertilizer after the rendition of fatty matter therefrom by the evaporation of the remaining liquid into a sirup, and then mixing such sirup with the solid animal matter and plaster-of-paris, substantially as described.

HENNELL STEVENS.

Witnesses:
J. N. CAMPBELL,
EDM. F. BROWN.